United States Patent
Angkititrakul et al.

(10) Patent No.: US 11,848,024 B2
(45) Date of Patent: Dec. 19, 2023

(54) SMART MASK AND SMART MASK SYSTEM

(71) Applicant: Robert Bosch GmbH, Stuttgart (DE)

(72) Inventors: Pongtep Angkititrakul, Dublin, CA (US); Xiaoyang Gao, San Jose, CA (US); Hyeongsik Kim, San Jose, CA (US); Xiaowei Zhou, Fremont, CA (US); Zhengyu Zhou, Fremont, CA (US)

(73) Assignee: Robert Bosch GmbH (DE)

( * ) Notice: Subject to any disclaimer, the term of this patent is extended or adjusted under 35 U.S.C. 154(b) by 222 days.

(21) Appl. No.: 17/158,314

(22) Filed: Jan. 26, 2021

(65) Prior Publication Data

US 2022/0238129 A1 Jul. 28, 2022

(51) Int. Cl.
*A41D 13/11* (2006.01)
*G10L 21/0232* (2013.01)
*H05B 47/12* (2020.01)
*A41D 13/00* (2006.01)
*G10L 25/18* (2013.01)
(Continued)

(52) U.S. Cl.
CPC ...... *G10L 21/0232* (2013.01); *A41D 13/0002* (2013.01); *A41D 13/11* (2013.01); *G10L 25/18* (2013.01); *G10L 25/51* (2013.01); *G10L 25/78* (2013.01); *H04B 1/38* (2013.01); *H04R 1/028* (2013.01); *H04R 1/08* (2013.01);
(Continued)

(58) Field of Classification Search
CPC ........... A41D 13/11; A61F 2013/00476; A61F 2012/00476; G10L 15/20; G10L 17/00; A61D 13/11

USPC ......................... 128/857–858; 704/233, 246
See application file for complete search history.

(56) References Cited

U.S. PATENT DOCUMENTS 2,578,007 A 12/1951 Hill
3,521,630 A 7/1970 Westberg et al.
(Continued)

FOREIGN PATENT DOCUMENTS

CN 108136237 A 6/2018
CN 110652663 A 1/2020
(Continued)

OTHER PUBLICATIONS

Maskmarket, https://www.prnewswire.com/news-releases/maskmarketcom-unveils-led-smart-mask-301119234.html. Aug. 27, 2020 (Year: 2020).*

(Continued)

*Primary Examiner* — George C Monikang
(74) *Attorney, Agent, or Firm* — Dickinson Wright PLLC

(57) ABSTRACT

A smart mask includes a main body having a back frame and a front cover. The back frame and the front cover each include an opening that is aligned with the mask wearer's mouth when worn. The front cover and back frame may be detachable from one another, or a single piece. A microphone is provided in the main body, as well as a speaker. A processor located in the main body is connected to the microphone and the speaker, and is configured to enhance the speech of the mask wearer. In particular, the processor receives audio signals representing a transformation of a spoken utterance of the wearer, processes the audio signals to enhance the speech, and then outputs the enhanced speech to the speaker. This helps other people better understand what the mask wearer is saying.

20 Claims, 3 Drawing Sheets

(51) Int. Cl.
*G10L 25/51* (2013.01)
*G10L 25/78* (2013.01)
*H04B 1/38* (2015.01)
*H04R 1/02* (2006.01)
*H04R 1/08* (2006.01)
*G10L 21/0216* (2013.01)

(52) U.S. Cl.
CPC .... *H05B 47/12* (2020.01); *G10L 2021/02163* (2013.01); *H04R 2201/023* (2013.01); *H04R 2420/07* (2013.01)

(56) References Cited

U.S. PATENT DOCUMENTS

| | | | |
|---|---|---|---|
| 4,491,699 | A | 1/1985 | Walker |
| 9,344,811 | B2 | 5/2016 | Bakish |
| 9,497,307 | B2 | 11/2016 | Jiang |
| 9,897,808 | B2 | 2/2018 | Yoo |
| 10,849,375 | B1* | 12/2020 | Bowen ............... A41D 13/1115 |
| 2003/0029454 | A1 | 2/2003 | Gelinas et al. |
| 2007/0078649 | A1* | 4/2007 | Hetherington ...... G10L 21/0216 704/226 |
| 2014/0081631 | A1 | 3/2014 | Zhu et al. |
| 2016/0001110 | A1 | 1/2016 | Hamilton et al. |
| 2016/0367842 | A1 | 12/2016 | Koehler |
| 2017/0039833 | A1* | 2/2017 | Baczuk ................... E05B 73/00 |
| 2020/0315266 | A1 | 10/2020 | McMahon |
| 2021/0345695 | A1* | 11/2021 | Adams ................. A62B 18/025 |

FOREIGN PATENT DOCUMENTS

| | | |
|---|---|---|
| CN | 111820501 A | 10/2020 |
| DE | 202020102429 U1 | 5/2020 |
| DE | 202020001697 U1 | 11/2020 |

OTHER PUBLICATIONS

Loizou PC, Kim G. Reasons why current speech-enhancement algorithms do not improve speech intelligibility and suggested solutions. IEEE Trans Audio Speech Lang Process. 2011;19(1):47-56. doi: 10.1109/TASL.2010.2045180. PMID: 21909285; PMCID: PMC3169296, 10 pages.

A. Hassani, A. Bertrand and M. Moonen, "Real-time distributed speech enhancement with two collaborating microphone arrays," 2017 IEEE International Conference on Acoustics, Speech and Signal Processing (ICASSP), New Orleans, LA, 2017, pp. 6586-6587, doi: 10.1109/ICASSP.2017.8005295, 2 pages.

Y. Cai, J. Yuan, X. Ma and C. Hou, "Low Power Embedded Speech Enhancement System Based on a Fixed-Point DSP," 2009 Eighth IEEE International Conference on Dependable, Autonomic and Secure Computing, Chengdu, 2009, pp. 132-136, doi: 10.1109/DASC.2009.30, 5 pages.

Main Page for "Smart Mask", Available at Website: https://en.donutrobotics.com/c-mask, Downloaded: Jan. 26, 2021, 9 pages.

Main Page for "Clear Mask", Available at Website: https://www.theclearmask.com/, Downloaded: Jan. 26, 2021, 6 pages.

* cited by examiner

SMART MASK AND SMART MASK SYSTEM

TECHNICAL FIELD

The present disclosure relates to a smart mask and a smart mask system.

BACKGROUND

Face masks (such as face coverings, surgical masks, N95 masks, and the like) are simple and effective ways to help decrease the spread of germs and infectious disease. These masks trap droplets that are released when the wearer sneezes, coughs, or talks. They can also protect the nose and mouth of the mask wearer from contacting respiratory droplets from other individuals. These masks are also used to filter out large particles in the air.

One pain point for the mask wearer is the degraded verbal communication caused by the mask. Speech is often muffled, volume is lessened, and intelligibility is heavily attenuated. This often times makes it difficult for a listener to understand what the mask wearer is saying. The mask wearer may need to speak louder than normal to maintain the loudness level for the listener. However, speech intelligibility may not be improved, and several sounds are still difficult to be perceived.

SUMMARY

According to an embodiment, a smart mask includes a main body having a back frame and a front cover. The back frame defines a central opening and a border surrounding the central opening, the border providing a surface configured to engage a replaceable filter. The front cover is at least partially removably attached to the back frame, the front cover defining a central opening aligned with the central opening of the back frame when the front cover is attached to the back frame, the front cover further defining a border surrounding the central opening, wherein at least a portion of the border of the front cover is configured to removably attach to the border of the back frame to enable replacement of the filter. The smart mask also includes a microphone embedded in the back frame and configured to receive an utterance from a mask wearer; a speaker embedded in the front cover; and a processor located in the main body and coupled to the microphone and the speaker and the memory, the processor programmed to (i) receive signals representing the utterance, (ii) execute the speech enhancement model stored in memory to enhance the utterance, and (iii) output signals to cause the speaker to output sound based on the enhancement of the utterance.

According to an embodiment, a smart mask includes a main body having a back frame configured to contact a wearer when the smart mask is worn, and a front cover configured to cover the back frame, wherein the back frame and the front cover cooperate to retain a replaceable filter; a proximity sensor fixed within the main body and configured to detect a distance an object is away from the proximity sensor; a light source fixed within the main body; and a processor embedded within the main body and coupled to the proximity sensor and the light source, wherein the processor is configured to cause the light source to emit a color in response to the detected distance being less than a distance threshold.

According to an embodiment, a system for enhancing speech of a mask wearer includes: a mask main body including a back frame and a front cover, the back frame including a first border defining a first opening aligned with a mouth of the mask wearer when worn, the front cover including a second border defining a second opening aligned with the first opening, wherein the back frame and the front cover cooperate to define a receptacle for receiving a replaceable filter; a microphone attached to the mask main body and configured to receive an utterance from a mask wearer; a speaker attached to the mask main body; a memory housed within the mask main body and containing a speech enhancement model that is trained from a plurality of acoustic models; and a processor housed within the mask main body. The processor is programmed to receive the utterance from the microphone, employ the speech enhancement model to process the utterance by estimating a spectrum of background noise as deviating from the utterance remove the spectrum of background noise, and output an enhanced utterance via the speaker with the spectrum of background noise removed.

DETAILED DESCRIPTION

Figure 1:
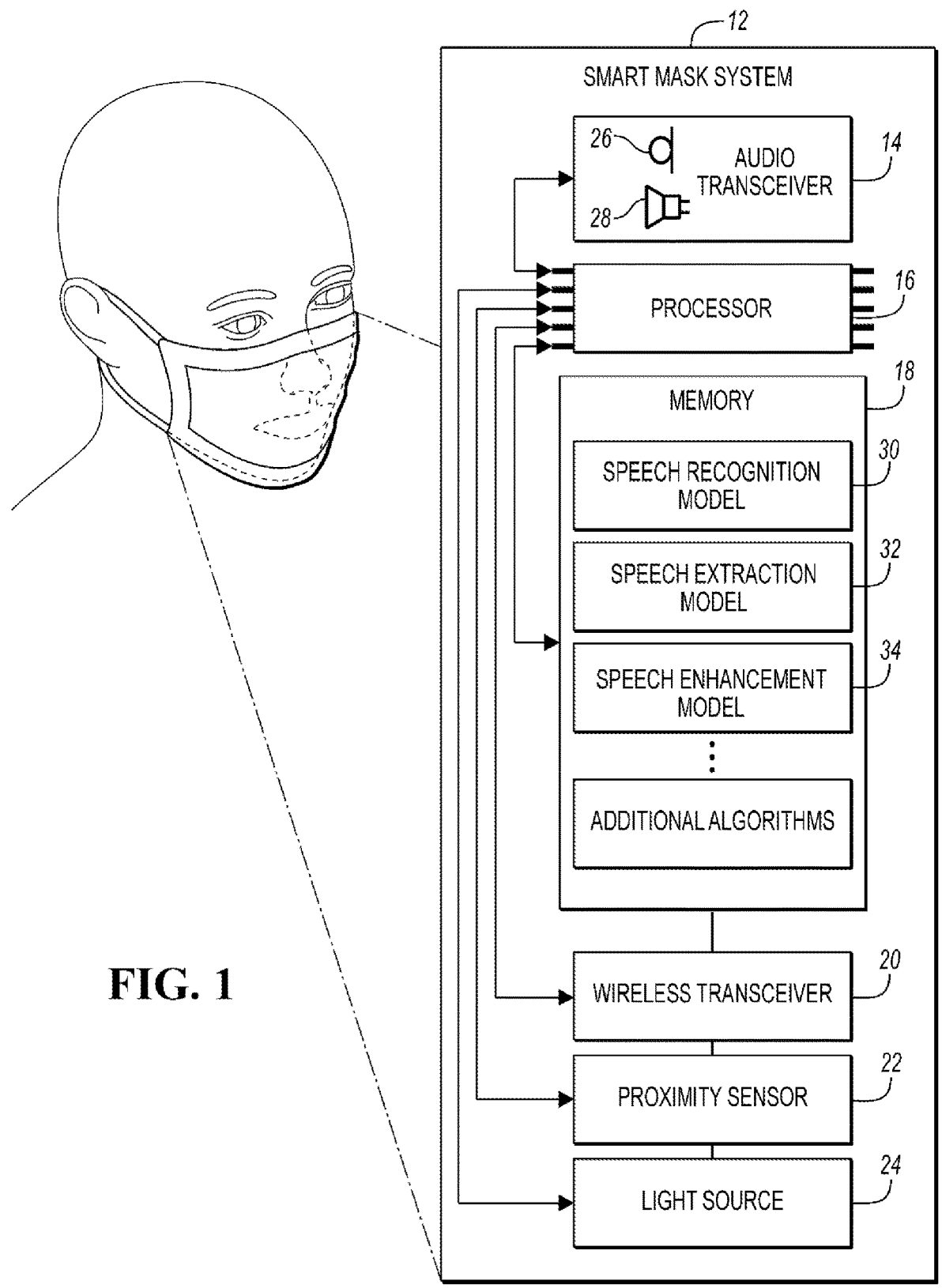
FIG. 1 is a schematic diagram illustrating a smart mask and an associated system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Face masks (such as face coverings, surgical masks, N95 masks, and the like) are simple and effective ways to help decrease the spread of germs and infectious disease. These masks may be more important now than ever with the spread of COVID-19. These masks can trap droplets that are released when the wearer sneezes, coughs, or talks. They can also protect the nose and mouth of the mask wearer from contacting respiratory droplets from other individuals. These masks are also used to filter out large particles in the air.

While masks can help stop the spread of infectious disease, they come with their problems. For one, masks make it harder for a person to hear what the mask wearer is saying. Speech is often muffled, volume is reduced, and clarity of the words spoken by the mask wearer is hindered. Even if the mask wearer speaks louder, it may still be hard to understand what the mask wearer is saying.

Therefore, according to various embodiments described herein, a mask 10 is disclosed that works to improve intelligibility and make it generally easier for a listener to understand what the mask wearer is saying. The mask 10 incorporates electronics to improve the speech. The mask 10 may therefore be referred to as a smart mask. The smart mask 10 also includes (or is part of) a smart mask system 12 that will be described in detail.

The smart mask 10 and associated smart mask system 12 is configured to receive an utterance or spoken speech from the mask wearer and, based on the utterance, output audio that enhances the utterance to improve the intelligibility of the utterance. Various devices may be provided as part of the mask 10 itself or an overall smart mask system 12 that includes the smart mask 10. These device may include an audio transceiver 14, one or more processors 16 (for purposes of illustration, only one is shown), any suitable quantity and arrangement of memory 18 such as non-volatile memory 18 (storing one or more programs, algorithms, models, or the like) and/or volatile memory. Accordingly, the smart mask system 12 comprises at least one computer (e.g., embodied as at least one of the processors 16 and memory 18), wherein the smart mask system 12 is configured to carry out the methods described herein. The smart mask system 12 may also include a wireless transceiver 20, proximity sensor 22, and light source 24 which will also be described in turn.

Figure 2:
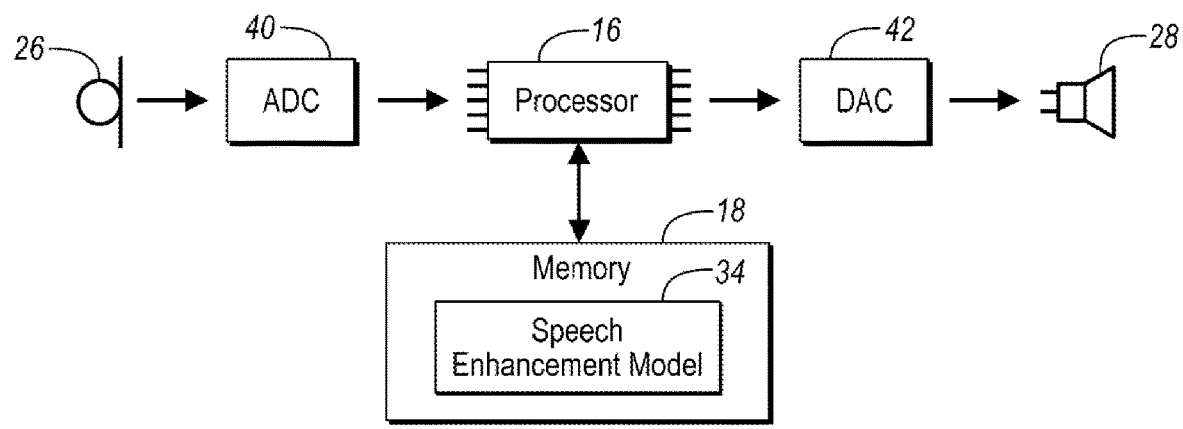
FIG. 2 is a diagram illustrated as a flow chart of sound coming in, being processed, and sent out of the smart mask, according to an embodiment.

The audio transceiver 14 may comprise one or more microphones 26, one or more speakers 28, and one or more electronic circuits (not shown) coupled to the microphone(s) 26 and speaker 28. The electronic circuit(s) may comprise an amplifier (e.g., to amplify an incoming and/or outgoing analog signal), a noise reduction circuit, an analog-to-digital converter (ADC), a digital-to-analog converter (DAC), and the like. The audio transceiver 14 may be coupled communicatively to the processor 16 so that audible human speech uttered by the mask wearer may be received into the smart mask system 12 via the microphone(s) 26 and so that a sound may be generated audibly to a listener via the speaker 28 once the dialog system 10 has processed the user's speech. This is shown in the diagram illustrated in FIG. 2. The microphone 26 is configured to receive an utterance spoken from the mask wearer, which can then be converted to digital via an ADC 40 for use by the processor 16. The processor 16 can then access the memory 18 which contains, among other things, the speech enhancement model 30 (discussed below) for enhancing the speech of the mask wearer. The processor 16 can then send a signal to a DAC 42 for conversion into an analog signal so that a sound can exit the speaker 28.

Of course other structure may be implemented in the smart mask system 12 that is not illustrated. For example, a noise filter, pre-amplifier, power amplifier, interference remover, and the like may be provided. An input buffer may be provided between the ADC 40 and the processor 16, and an output buffer may be provided between the processor 16 and the DAC 42.

If one microphone 26 is used with the smart mask 10, a single-channel speech enhancement solution can be utilized. If two or more microphones 26 are used with the smart mask 10, a microphone array solution can be utilized to enhance the speech intelligibility. Alternatively, a fixed-point DSP solution can be utilized to reduce the power consumption.

The processor(s) 16 may be programmed to process and/or execute digital instructions to carry out at least some of the tasks described herein. Non-limiting examples of processor(s) 16 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc. The processor 16 may therefore also be referred to as a controller. In at least one example, the processor 16 reads from memory 18 and executes multiple sets of instructions which may be embodied as a computer program product stored on a non-transitory computer-readable storage medium (e.g., such as non-volatile memory). Some non-limiting examples of instructions are described in the processes below and illustrated in the drawings. These and other instructions may be executed in any suitable sequence unless otherwise stated. The instructions and the example processes described below are merely embodiments and are not intended to be limiting.

The memory 18 may include both non-volatile memory and/or volatile memory. Non-volatile memory may comprise any non-transitory computer-usable or computer-readable medium, storage device, storage article, or the like that comprises persistent memory (e.g., not volatile). Non-limiting examples of non-volatile memory include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory may store one or more sets of instructions which may be embodied as software, firmware, or other suitable programming instructions executable by the processor 16—including but not limited to the instruction examples set forth herein. For example, according to an embodiment, non-volatile memory may store various programs, algorithms, models, or the like, such as a speech recognition model 30, a speech extraction model 32, and/or a speech enhancement model 34, which will be described in turn. According to an example, the memory 18 may store any combination of the one or more of the above-cited models (30-34) and may not store others. These models 30-34 each may comprise a unique of set instructions, and models 30-34 are merely examples (e.g., one or more other programs may be used instead).

The memory 18 may optionally include volatile memory, which may comprise any non-transitory computer-usable or computer-readable medium, storage device, storage article, or the like that comprises nonpersistent memory (e.g., it may require power to maintain stored information). Non-limiting examples of volatile memory 26 include: general-purpose random-access memory (RAM), static RAM (SRAM), dynamic RAM (DRAM), or the like.

Herein, the term memory may refer to either non-volatile or volatile memory, unless otherwise stated. During operation, processor 16 may read data from and/or write data to memory 18, which may include volatile or non-volatile memory.

The speech recognition model 30 may be any suitable set of instructions that processes audible human speech. According to an example, speech recognition model 30 converts mask wearer's human speech into recognizable and/or interpretable words (e.g., textual speech data). A non-limiting example of the speech recognition model 30 is a model comprising an acoustic model, a pronunciation model, and a language model—e.g., wherein the acoustic model maps audio segments into phonemes, wherein the pronunciation model connects the phonemes together to form words, and wherein the language model expresses a likelihood of a given phrase. Continuing with the present example, speech recognition model 30 may, among other things, receive human speech via microphone(s) 26 and determine the uttered words and their context based on the textual speech data.

The speech extraction model 32 may be any suitable set of instructions that extract signal speech data from a mask wearer's audible human speech and use the extracted signal speech data to clarify ambiguities that arise from analyzing the text without such signal speech data. Further, in some examples, the speech extraction model 32 may comprise instructions to identify sarcasm information in the audible human speech. Thus, the speech extraction model 32 facilitates a more accurate interpretation of the audible human speech; consequently, using information determined by the speech extraction model 32, the smart mask system 12 may generate more accurate responses.

According to at least one example, the speech extraction model 32 uses raw audio (e.g., from the microphone 26) and/or the output of the speech recognition model 30. Signal speech data may comprise one or more of a prosodic cue, a spectral cue, or a contextual cue, wherein the prosodic cue comprises one or more of an accent feature, a stress feature, a rhythm feature, a tone feature, a pitch feature, and an intonation feature, wherein the spectral cue comprises any waveform outside of a range of frequencies assigned to an audio signal of a user's speech (e.g., spectral cues can be disassembled into its spectral components by Fourier analysis or Fourier transformation), wherein the contextual cue comprises an indication of speech context (e.g., circumstances around an event, statement, or idea expressed in human speech which provides additional meaning). Types of extracted signal knowledge (i.e., the signal speech data) will be discussed in detail below.

The speech enhancement model 34 may include the speech recognition model 30 and/or speech extraction model 32, or may be a standalone model receiving data from either model 30, 32. In other words, each of the models described herein may generally be referred to as a speech enhancement model. The speech enhancement model 34 is generally configured to enhance the speech prior to output to the speaker 28. The model-based speech enhancement may be utilized to improve speech intelligibility. The speech enhancement model 34 can be trained from several acoustic models to represent mapping between unclear and clear speech sounds. The clear sound may be obtained from decoding the trained model with the highest likelihood score that matches the unclear sound. Ultimately, the clear sound may be output from the processor(s) 16 for output to the speaker 28. The sound output from the speaker 28 can match the pitch and tone of the real-time utterance of the mask wearer, and the combination of the real un-processed utterance from the mask wearer with the sound output from the speaker 28 improves the intelligibility of the sound for better listening.

The speech enhancement model 34 may be an end-to-end neural network or any suitable neural network that is trained to generate an enhanced speech signal based on the input utterance. In one example, the speech enhancement model 34 utilizes deep learning processes (e.g., end-to-end learning) that includes a training component (e.g., in which the processor(s) 16 records all parameters executed by the human operator (e.g., through convolutional neural networks, CNNs)) and an inference component (e.g., in which the processor(s) 16 acts upon previously gained experience from the training component.

The speech enhancement model 34 can utilize a noise-estimation algorithm as part of its speech enhancement. In such a system, a spectrum of background noise is estimated as deviating from the spoken utterances, and those background noise spectra are removed from the sound signals sent to be output by the speaker 28. In an embodiment, the multi-channel Wiener filter (MWF) is utilized. In an embodiment, a distributed adaptive node-specific signal estimation (DANSE) algorithm which is a distributed realization of the MWFs of the individual nodes of the smart mask (e.g., each microphone and associated processing architecture), and which allows the nodes to cooperate by exchanging pre-filtered and compressed signals while eventually converging to the same centralized MWF solutions as if each node would have access to all the microphone signals in the smart mask. In an embodiment, a generalized eigenvalue decomposition (GEVD)-based DANSE can be utilized in which each node incorporates a GEVD-based low-rank approximation of the speech correlation matrix in its local MWF. In an embodiment, a double buffering (e.g., Ping-Pong buffer) can be implemented in two buffers, one Ping and one Pong, each receive data, buffer the data, and transmit the data back for further buffering by the other buffer. For example, if one receiving buffer (e.g., Ping) is already full, data from a buffer port (e.g., multichannel buffered serial ports, McBSP) can be transferred to the receiving buffer (e.g., Pong) and the controller can convey the processed data in the transmitting Pong buffer to the McBSP to send out. At the same time, the processor processes the data in the Ping receiving buffer and put the enhanced data into the Ping transmitting buffer.

Once speech or an utterance is recognized by model 30, and optionally extracted by model 32, the speech or utterance may be enhanced by enhancement model 34 implementing either digital signal processing machine learning, or other methods described herein, and eventually the enhanced speech is output by the speaker 28. The speech enhancement model 34 is configured to output those spoken words in a clear fashion with little or no noise or other interference. Once converted to analog (e.g., via DAC 42), sound can be output from the speaker 28 that includes the amplified, clear spoken words in a pitch and frequency that matches the real-time spoken utterance from the mask wearer.

The models described herein (e.g., models 30-34) may be configured to perform digital signal processing using software pre-programmed and fixed in the memory 18. The models 30-34 may also implement machine learning functions, in which the memory 18 stores one or more learning engines executable by the processor(s) 16 to process data of utterances received from the microphone 26, and develop utterance or spoken word metadata on the mask wearer. Machine learning generally refers to the ability of a computer application to learn without being explicitly programmed. In particular, a computer application performing machine learning (sometimes referred to as a learning engine) is configured to develop an algorithm based on training data. For example, to perform supervised learning, the training data includes example inputs and corresponding desired (e.g., actual) outputs, and the learning engine progressively develops a model that maps inputs to the outputs included in the training data. Machine learning can be performed using various types of methods and mechanisms including, but not limited to, decision tree learning, association rule learning, artificial neural networks, inductive logic programming, support vector machines, clustering, Bayesian networks, reinforcement learning, representation learning, similarity and metric learning, sparse dictionary learning, and genetic algorithms.

It will be appreciated that computer programs, algorithms, models, or the like may be embodied in any suitable instruction arrangement. For example, one or more of the speech recognition model 30, speech extraction model 32, speech enhancement model 34, and any other additional suitable programs, algorithms, or models may be arranged as a single software program, multiple software programs capable of interacting and exchanging data with one another via processor(s) 16, etc. Further, any combination of the above programs, algorithms, or models may be stored wholly or in part on memory 18.

The wireless transceiver 20 can be integrated into the mask 10 or external to the mask 10 but part of the smart mask system 12. The wireless transceiver 20 enables communication between the smart mask system 12 and another device, such as a mobile device (e.g., smart phone, smart watch, other wearable devices, etc.). This can enable communication from the smart mask 10 to an electronic personal assistant on the device, such as Siri™ for Apple™ devices or Google Assist™ (Google Now™) for Android™ devices. As such, the wireless transceiver 20 may be configured to communicate with the device via Bluetooth, Bluetooth Low Energy (BLE), Z-Wave, ultra-high frequency (UHF), Zig-Bee or other communication protocol based on IEEE 802.15.4, and the like.

The wireless transceiver 20 is also communicatively connected to the processor(s) 16 and interactive with the speech enhancement models implemented. For example, the speech that is recognized by the models described herein in digital form can be communicated to the electronic personal device for commands. This can clarify the commands given to the personal assistant for better processing by the personal assistant. As described herein, any mask or face covering can interfere with the intelligibility of utterances; by enhancing the speech and then sending a signal to the electronic personal assistant based on the enhanced speech, the electronic personal assistant is better able to understand and process the commands given by the mask wearer.

In other embodiments, the wireless transceiver 20 is coupled to the processor(s) 16 in a way that the utterance from the mask wearer is transmitted to the mobile device without any speech enhancement. For example, the utterance can be merely passed through the system 12 from microphone 26 and ADC 40, and transmitted as a digital signal to the mobile device without relying on any models 30-34, etc. Thus an unfiltered and raw voice is converted to a digital signal and transmitted to the mobile device.

The proximity sensor 22 and light source 24 can also optionally be integrated into the mask 10, or external to the mask 10 but part of the smart mask system 12. The proximity sensor 22 is configured to detect the existence of a nearby object within a threshold distance (e.g., six feet) from the sensor. The light source 24 may activate in response to the proximity sensor 22 indicating an object is closer to the sensor than the threshold distance. This can warn both the mask wearer and the external object (e.g., another person) that they are unsafely close to one another. Current Center for Disease Control (CDC) guidelines recommend six feet be maintained between conversing people, and the use of the proximity sensor 22 and light source 24 can be a tool to warn the people to keep their distance safely.

The proximity sensor may be any type of sensor configured to detect the presence of nearby objects without any physical contact. It may, for example, emit an electromagnetic field or beam of electromagnetic radiation (e.g., infrared) and look for changes in the field or return signal. In other embodiments, the proximity sensor 22 may be embodied as a capacitive sensor, inductive sensor, magnetic sensor, optical sensor (e.g., photocell), or may utilize radar, sonar, or the like. A signal from the proximity sensor 22 is output to the processor 16, which accesses predetermined rules stored in memory 18 regarding the threshold distance, for example. In response to the signal from the proximity sensor indicating a distance between the sensor 22 and an external object being less than the stored threshold distance, the processor 16 can activate the light source 24 (e.g., light-emitting diode, LED, or the like) mounted on the mask 10.

In one embodiment, the light source 24 will emit a first color in response to the processor 16 recognizing that the mask wearer is speaking, via the microphone 26. The light source 24 may emit a second color (different than the first color) in response to the processor 16 recognizing that a nearby object is closer than the threshold distance, via the proximity sensor 22. For example, as the mask wearer is talking, the light source 24 may emit a yellow light, and if the proximity sensor 22 detects a person within the threshold distance (e.g., six feet), the light source 24 may change to emit a red light.

Figure 3:
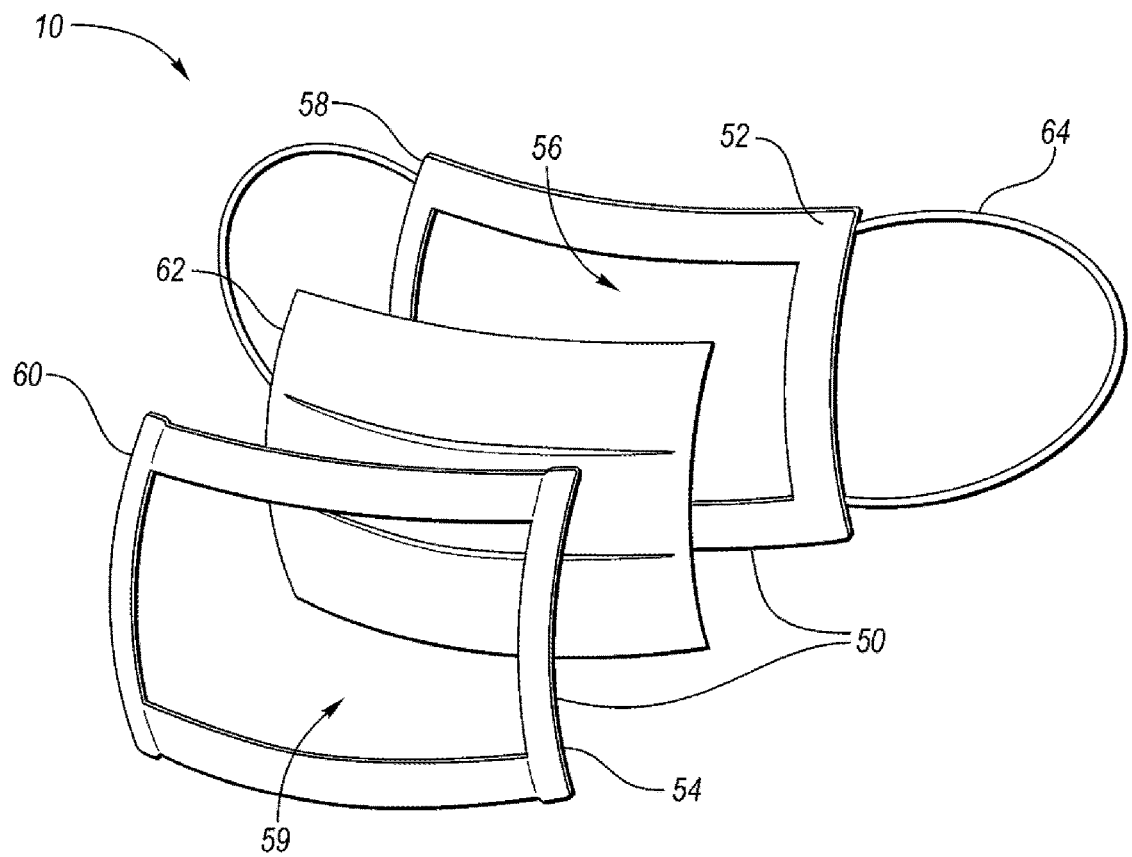
FIG. 3 is an exploded perspective view of a main body of the smart mark, according to an embodiment.

FIG. 3 illustrates an exploded perspective view of a main body 50 of the mask 10, according to an embodiment. The main body 50 includes a back frame 52 and a front covering 54 configured to attach to the back frame 52. The attachment between the back frame 52 and the front covering 54 can be a hinge connection or the like, maintaining connection or contact in a certain region at all times such that electronic wiring and the like can pass therethrough even when the back frame 52 and front covering 54 are open or separated to receive a filter 62. While the back frame 52 and front covering 54 are shown as separate components, it should be understood that in other embodiments they are a single unit. The back frame 52, front covering 54, and filter 62 can be referred to as a mask assembly.

The back frame 52 may have an opening 56 with a border 58 surrounding the opening 56. Likewise, the front covering 54 may have an opening 59 with a border 60 surrounding the opening 59. The openings 56, 59 are present receive a filter 62 or mask material that covers the openings 56, 59 as will be described. The border 58 of the back frame 52 provides an attachment area for the border 60 of the front covering 54. The attachment area (e.g., the side of the border 58 facing the front covering 54) may be a planar surface, and/or may be provided with a suitable attachment for the border 60 of the front covering 54. For example, the border 58 may have an adhesive, hook and loop (e.g., Velcro™), hooks, tabs, latches, or other such attachments to allow the wearer to easily remove or detach the front covering 54 from the back frame 52 to access and replace the filter 62, for example.

Either one or both of the borders 58, 60 may have surface features formed thereon that provide a grip for the filter 62 to attach to. For example, the borders 58, 60 (or at least the surfaces of the borders facing one another) can be made of a vinyl, foam (e.g., vinyl foam, polyethylene foam, closedcell neoprene, etc.) high-density urethane, or other suitable material that provide a grip to hold the filter 62 against it.

Rather than a removable attachment, the front covering 54 may be attached to the back frame 52 in a more permanent manner (e.g., stitching, gluing, co-molding, fastened, etc.). Or, the front covering 54 and the back frame 52 may be a single unitary component. In either embodiment, the front covering 54 and/or the back frame 52 may define a receptacle (e.g., an opening, a pocket, etc.) sized and configured to receive the filter 62 therein. In use, the mask wearer can open the main body 50 (e.g., by opening the hinge connection between the back frame 52 and the front covering 54, or otherwise at least partially disconnecting the front covering 54 from the back frame 52) or simply access the receptacle defined between the back frame 52 and the front covering 54. The mask wearer can then remove the filter 62 therein, and replace with another filter. This preserves the main body 50 of the smart mask (allowing it for reuse) while allowing the filter to be replaced as needed.

The back frame 52 and the front covering 54 may be made of a rigid material, such as plastic. The plastic may be form-fitted to the shape of the wearer's face. For example, the back frame 52 may be molded or otherwise formed to take the shape of the wearer's face. Alternatively, the back frame 52 and front covering 54 may be made of a flexible material configured to seal against the wearer's face. In such an embodiment, the back frame 52 (or at least the surface facing the wearer) may be made of a rubber or thin plastic film or membrane that can bend and flex to the contours of the wearer's face. Alternatively, the back frame 52 may be made of a rigid material (e.g., plastic) on a front side and a thin or more flexible material on the back side for contacting the wearer's face. In other words, the main body 50, which comprises the back frame 52 and the front covering 54, may include a first material with a first flexibility on a front side, and a second material with a second flexibility (greater than the first) on a back side for sealing with the face. The first material can house the electronic components and provide a rigid surface for contacting the front covering 54, while the second material can seal with the wearer's face.

The back frame 52 may include ear loops 64 configured to wrap around the ears of the mask wearer to hold the smart mask in place on the wearer's face. This is but one example of maintaining the mask on the wearer's face. In another embodiment, the loops are replaced with straps or bands configured to tie together behind the wearer's face rather than wrap around the wearer's ears.

The filter 62 be made of a suitable material for properly filtering contagious diseases. For example, the filter 62 may be an N95 (e.g., 95% efficient at filtering 0.3 µm particles), N99 or N100 respirator. Alternatively, the filter 62 may be made of a cloth, or can itself be a surgical mask. The filter 62 may be made of an electrostatic non-woven polypropylene fiber, or can also be made of polystyrene, polycarbonate, polyethylene or polyester. The filter 62 may have its own loops configured to wrap around the wearer's ears, for example if the filter 62 itself is a surgical mask. If so, the filter 62 can be placed within the main body 50 of the smart mask 10 with its loops outside of the main body 50 to enable the loops to be available to wrap around the wearer's ears.

In one example use, a user can open the main body 50 by disconnecting the front cover 54 from the back frame 52. The user can remove an old filter if one was there. The user can then attach a new filter 62 to the back frame 52 such that it covers the opening 56. The material of the border 58 described above can give the filter 62 an anti-slip engagement with the back frame 52. The front cover 54 can then be placed over the filter 62 and attached to the back frame 52 such that the opening 59 of the front cover 54 aligns with the opening 56 of the back frame 52, and only the filter 62 is present in that area of the smart mask 10. Any ear loops or other head attachments of the filter 62 can be wrapped around the user's head or ears, as with the ear loops 64 of the main body 50.

In another example of use, the main body 50 is a single integral unit with a slot or pocket for changing out filters 62. The user can access a pocket or slot in the main body 50, retrieve the old filter and discard it. A new filter 62 can then be placed in the slot or pocket, between the back frame 52 and front cover 54. The interior of the slot or pocket can include material described above with respect to the borders 58, 60 to provide a grip for the filter 62. The ear loops 64 or the like of the main body 50 can then be fastened around the user's ears.

Figure 4:
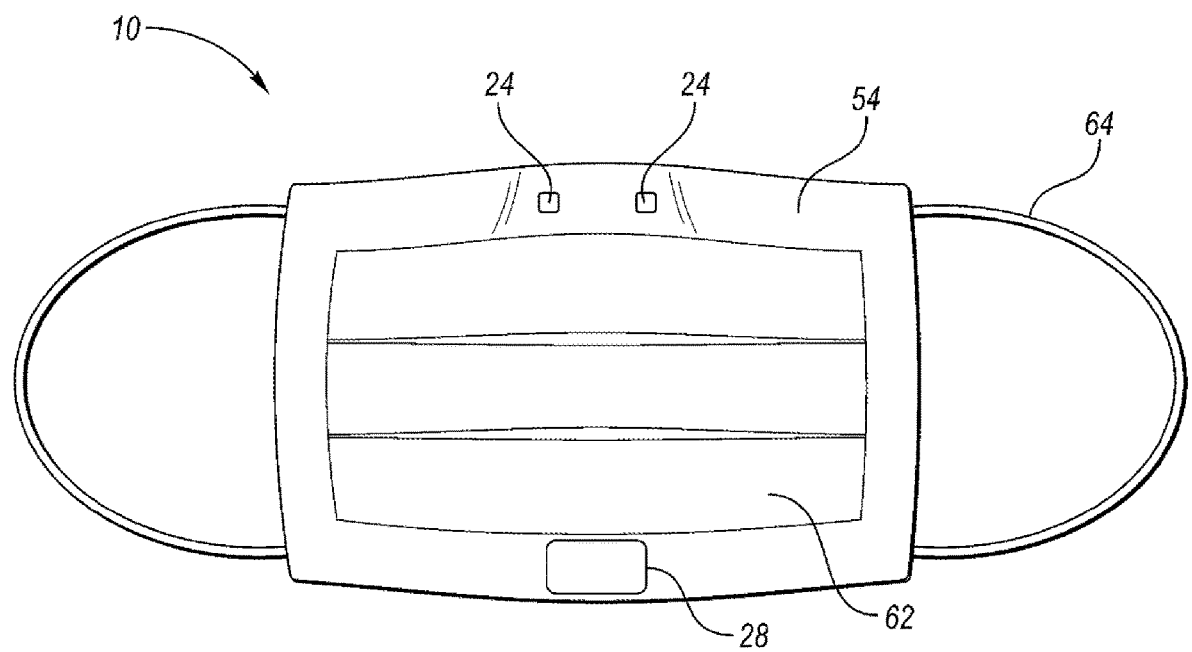
FIG. 4 is a front view of the smart mask (i.e., the side of the smart mask that faces away from the wearer), according to an embodiment.

FIG. 4 illustrates a front view of smart mask 10, specifically the front cover 54 viewed from a standpoint in front of the smart mask 10 as worn by a wearer. This view also shows a filter 62 attached to the main body 50, covering the openings 56, 59 described above. The proximity sensor 22, light source 24, and speaker 28 are shown here fixed within the front covering 54. The proximity sensor 22, light source 24, and speaker 28 may all be powered by wire to a battery (not shown) which can be fixed or otherwise located within either the back frame 52 or the front cover 54 of the smart mask. The battery may also power the other components, such as the processor 16, memory 18, and the like. Likewise, the proximity sensor 22, light source 24 and speaker 28 may be connected by wire to the processor 16, which can be located in either the back frame 52 or front cover 54. The speaker 28 may be embedded into the front cover 54, at a bottom of the front cover in a location that is aligned with the wearer's mouth.

The output volume of the speaker 28 can be dynamically adjusted by the controller 16 based on the volume of the original speech uttered by the mask wearer. Also, the output volume of the speaker 26 can be dynamically adjusted by the controller 16 based on the distance between the mask wearer and another person as indicated by the proximity sensor 22. For example, if the proximity sensor detects an external object being 20 feet away, the controller 16 may amplify the volume output by the speaker 28 accordingly, and may reduce the volume output by the speaker 28 as the distance is reduced. In an embodiment, a threshold distance may be set (e.g., six feet) in which, if the distance to the other person as detected by the proximity sensor 22 is less than that threshold, the speaker 28 will no longer output sound.

Figure 5:
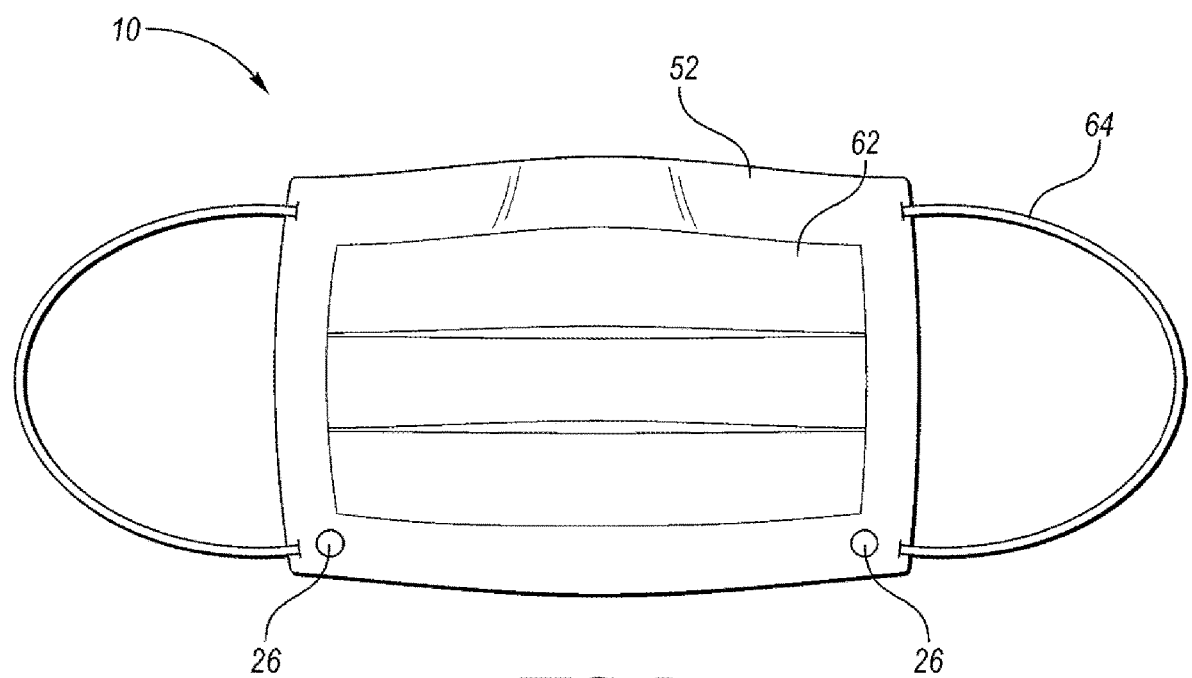
FIG. 5 is a rear view of the smart mask (i.e., the side of the smart mask that faces from the wearer), according to an embodiment.

FIG. 5 illustrates a back view of the smart mask 10, specifically the back frame 52 viewed from a standpoint from the mask wearer. In other words, FIG. 5 shows the side of the smart mask 10 that faces the wearer. This view shows two microphones 26 embedded or otherwise fixed within the back frame 52, facing the wearer. Additional microphones can be utilized. The microphone(s) 26 capture audio signals uttered by the mask wearer for processing by the processor according to the teachings herein.

In an alternative embodiment, the speaker 26 may be embedded in the back frame 52 rather than the front covering 54. This embodiment may be utilized if, for example, the front covering 54 is smaller than the back frame 52. The front covering 54 may have a corresponding opening or cut-out in a location where the speaker 26 is so as to not interfere with the sound output by the speaker 26.

One or more additional microphones can be placed outside the front covering 54 of the smart mask 10 configured to capture environmental audio signals. These audio signals can be provided to the processor 16 to allow filtering of background acoustics for better audio processing of the utterances.

In one embodiment, the smart mask 10 may implement or provide a health monitor system for the wearer. For example, the microphone(s) 26 may receive audio data indicative of breathing patterns. The controller or processor 16 can process such audio and determine that the breathing patterns of the wearer has changed, or increase in rate or change in pitch. If the rate of breathing, or the change in the rate of breathing has exceeding a corresponding threshold, a notification can be sent to the wearer's mobile device (e.g., via transceiver 20), or the light source 24 can be activated to alert the wearer and others of a potential health issue.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A smart mask comprising:
   a main body including:
   a back frame defining a central opening and a border surrounding the central opening, the border providing a surface configured to engage a replaceable filter, and
   a front cover at least partially removable and reattachable to the back frame, the front cover defining a central opening aligned with the central opening of the back frame when the front cover is attached to the back frame, the front cover further defining a border surrounding the central opening, wherein a first portion of the border of the front cover is configured to be removed and reattached to the border of the back frame to enable replacement of the filter, and wherein a second portion of the border of the front cover maintains connection to the border of the back frame during such replacement of the filter such that electrical communication between the front frame and back frame is maintained during such replacement;
   a microphone embedded in the back frame and configured to receive an utterance from a mask wearer;
   a speaker embedded in the front cover; and
   a processor located in the main body and coupled to the microphone and the speaker, the processor programmed to (i) receive signals representing the utterance, (ii) execute a speech enhancement model stored in memory to enhance the utterance, and (iii) output signals to cause the speaker to output sound based on the enhancement of the utterance.

2. The smart mask of claim 1, wherein the back frame includes loops or fasteners configured to attach to a head of the mask wearer.

3. The smart mask of claim 1, wherein the front cover and the back frame define a hinge that enables the back frame and the front cover to remain in contact while the front cover is partially removed from the back frame.

4. The smart mask of claim 1, wherein the border of the back frame is provided with a grip configured to maintain a position of the replaceable filter within the main body.

5. The smart mask of claim 1, further comprising:
   a light source embedded in the main body and coupled to the processor; and
   a proximity sensor embedded in the main body, coupled to the processor, and configured to detect a distance from the proximity sensor to a person;
   wherein the processor is configured to activate the light source in response to the detected distance being below a threshold distance.

6. The smart mask of claim 1, further comprising:
   a light source embedded in the main body and coupled to the processor; and
   a proximity sensor embedded in the main body, coupled to the processor, and configured to detect a distance from the proximity sensor to a person;
   wherein the processor is configured to emit a first color in response to signals received from the microphone indicating the mask wearer is speaking, and emit a second color in response to the detected distance being below a threshold distance.

7. The smart mask of claim 1, further comprising a wireless transceiver configured to communicate signals representing the enhancement of the utterance to a mobile device of the wearer.

8. A smart mask comprising:
   a main body having a back frame configured to contact a wearer when the smart mask is worn, and a front cover configured to cover the back frame, wherein the back frame and the front cover cooperate to retain a replaceable filter;

a proximity sensor fixed within the main body and configured to detect a distance an object is away from the proximity sensor;

a light source fixed within the main body; and a processor embedded within the main body and coupled to the proximity sensor and the light source, wherein the processor is configured to cause the light source to emit a color in response to the detected distance being less than a predetermined, fixed distance threshold.

9. The smart mask of claim 8, wherein the distance threshold is six feet.

10. The smart mask of claim 8, further comprising a microphone embedded in the back frame and configured to detect an utterance by the wearer, wherein the processor is configured to cause the light source to change color in response to the utterance by the wearer.

11. The smart mask of claim 10, wherein the processor is configured to cause the light source to emit a first color in response to the microphone detecting the utterance by the wearer, and cause the light source to emit a second color in response to the detected distance being less than the distance threshold.

12. The smart mask of claim 8, further comprising:

a microphone configured to detect an utterance by the wearer; and a speaker fixed to the main body;

wherein the processor communicates with memory housed within the main body that includes instructions that, when executed by the processor, causes the processor to (i) execute a speech enhancement model stored in memory to process the utterance and create an enhanced utterance, and (ii) output signals to cause the speaker to output sound based on the enhanced utterance.

13. The smart mask of claim 12, further comprising a wireless transceiver configured to communicatively connect to a mobile device of the wearer, wherein the processor is configured to cause the wireless transceiver to send signals to the mobile device representative of the enhanced utterance.

14. A system for enhancing speech of a mask wearer, the system comprising:

a mask main body including a back frame and a front cover, the back frame including a first border defining a first opening aligned with a mouth of the mask wearer when worn, the front cover including a second border defining a second opening aligned with the first opening, wherein the back frame and the front cover cooperate to define a receptacle for receiving a replaceable filter;

a microphone attached to the mask main body and configured to receive an utterance from a mask wearer;

a speaker attached to the mask main body;

a memory housed within the mask main body and containing a speech enhancement model that is trained from a plurality of acoustic models; and a processor housed within the mask main body and programmed to:

receive the utterance from the microphone, employ the speech enhancement model to process the utterance by estimating a spectrum of background noise as deviating from the utterance remove the spectrum of background noise, and output an enhanced utterance via the speaker with the spectrum of background noise removed.

15. The system of claim 14, wherein the mask main body is a single unitary component and the receptacle is formed in the mask main body.

16. The system of claim 14, wherein the front cover is at least partially removably attached to the back frame to enable access to the receptacle to replace the filter.

17. The system of claim 14, further comprising:

a light source secured within the mask main body and coupled to the processor; and a proximity sensor secured within the mask main body, coupled to the processor, and configured to detect a distance between the proximity sensor and an object;

wherein the processor is configured to activate the light source in response to the detected distance being below a threshold distance.

18. The system of claim 14, further comprising:

a light source secured within the mask main body and coupled to the processor; and a proximity sensor secured within the mask main body, coupled to the processor, and configured to detect a distance between the proximity sensor and an object;

wherein the processor is configured to emit a first color in response to signals received from the microphone indicating the mask wearer is speaking, and emit a second color in response to the detected distance being below a threshold distance.

19. The system of claim 14, further comprising a wireless transceiver configured to communicate the enhanced utterance to a mobile device of the mask wearer.

20. The system of claim 14, wherein at least one of the first border and second border is provided with a grip surface for contact with the filter.

* * * * *